UNITED STATES PATENT OFFICE.

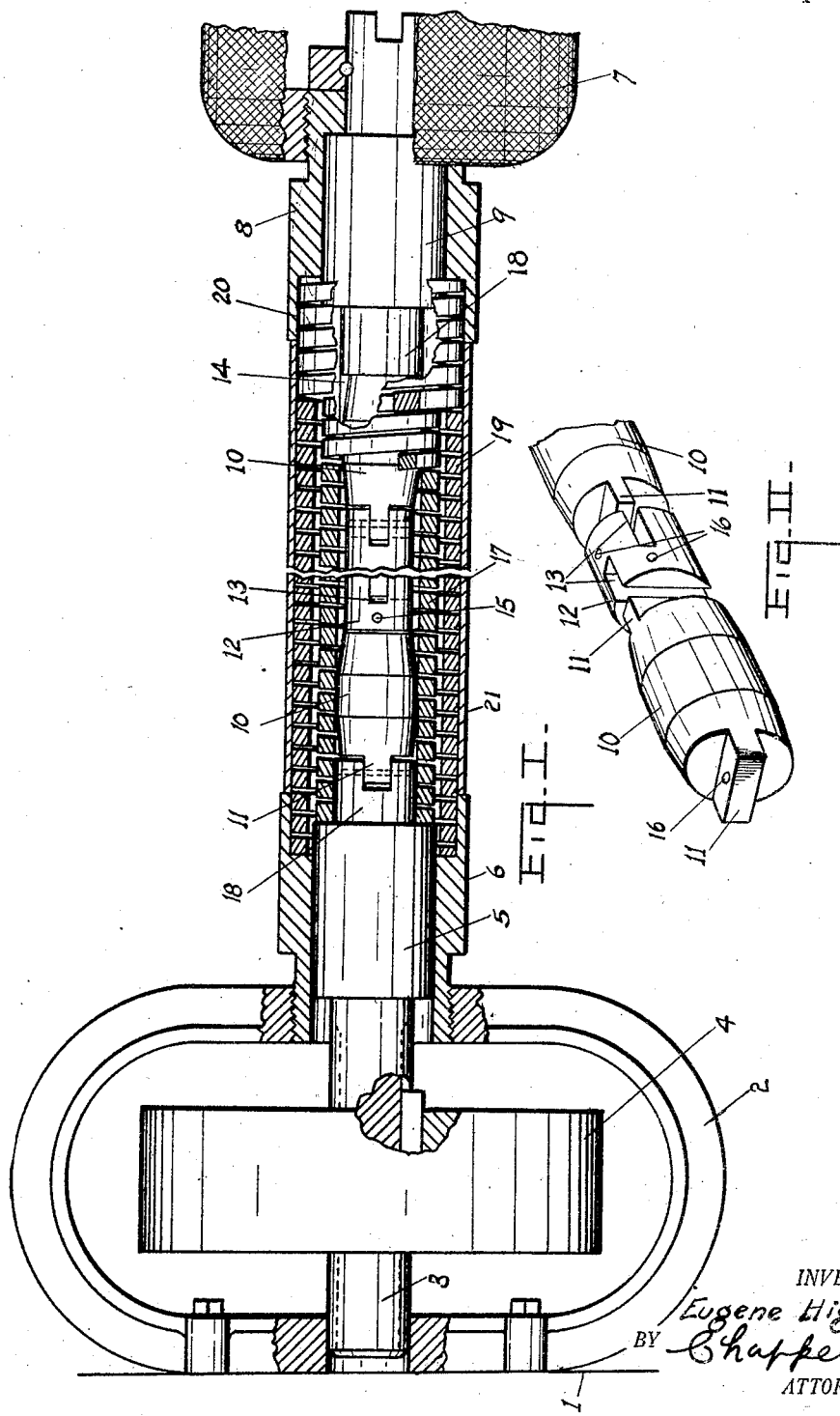

EUGENE HIGGINS, OF JACKSON, MICHIGAN.

FLEXIBLE SHAFTING.

1,411,433.

Specification of Letters Patent.   Patented Apr. 4, 1922.

Application filed April 6, 1921. Serial No. 458,913.

*To all whom it may concern:*

Be it known that I, EUGENE HIGGINS, a citizen of the United States, residing at Jackson, county of Jackson, State of Michigan, have invented certain new and useful Improvements in Flexible Shafting, of which the following is a specification.

This invention relates to improvements in flexible shafting.

The main object of this invention is to provide a flexible shaft in which the revoluble parts are effectively protected and guarded.

Another object is to provide an improved flexible shaft in which the driving strain is received by substantial parts or parts of substantial size and at the same time the shafting may be made in small diameters.

Further objects and objects relating to details and economies of structure and operation, will definitely appear from the detailed descripton to follow.

I accomplish the objects of my invention by the devices and means described in the following specification. The invention is clearly defined and pointed out in the claims.

A structure which is a preferred embodiment of my invention is clearly illustrated in the accompanying drawing, forming a part of this specification, in which:

Fig. I is a detail view of a structure embodying the features of my invention partially in central longitudinal section.

Fig. II is a detail perspective of a pair of links or units and their connection disconnected, but showing their coacting relation.

In the drawing similar reference characters refer to similar parts throughout the several views.

Referring to the drawing 1 represents a frame or support and 2 a yoke thereon supporting a driving spindle 3 having a pulley 4 thereon. The driving member 5 is supported in the bearing 6 on the yoke 2. 7 represents the body of a chuck which is provided with the bearing 8 for the driven member 9.

My improved flexible shafting comprises a plurality of barrel shaped links or units 10 having tongues 11, and each end disposed in planes at right angles to each other. Intermediate these units are disposed connectors 12 with slots 13 in the opposite ends disposed in planes at right angles to each other and preferably intersecting at the center. These slots are to receive the projecting tongues on the ends of the barrel members and are retained in place by suitable coupling pins 15 disposed through holes 16 therein. The driven member is provided with a suitable slot 14 to receive the tongue 11 of the adjacent link member.

The links are supported by a coiled spring 17 which closely embraces the links as shown in the drawing, rotating therewith, the ends of this spring being engaged with the shouldered portions 18 of the driving and driven members. This supporting spring is driven with the links and supports them laterally, the function of the pins being mainly to support the parts in assembling and to prevent their being displaced by severe kinks or sharp bends.

I provide a housing spring 19 the ends of which are engaged in recesses 20 in the members 6 and 8. This spring is of such diameter that it is supported out of contact with the spring 17. A casing 21 such as a piece of tubing is preferably provided for the housing spring.

With the parts thus arranged I provide a flexible shaft, the parts of which are very economical to produce and may be rapidly assembled. The shafting is very strong, as its driving parts are of substantial size and at the same time it is flexible, the links being freely movable upon each other.

While I have shown the links barrel shaped, I will say that that is especially desirable in shafts of the larger size. In small sizes it is preferred that they be cylindrical in form.

I also desire to state that the ends can be differently connected to the driving and driven members. I have simply shown the preferred form.

I also desire to state that the particular protecting and supporting casings are available in various relations but lend themselves especially well to the form of a central driving character.

I desire to claim the invention specifically as well as broadly, as pointed out in the appended claims.

Having thus described my invention, what I claim as new and desire to secure by Letters Patent is:

1. A flexible shaft comprising driving and driven members, a plurality of barrel-shaped links having tongues at opposite ends disposed at right angles to each other, connectors with slots at opposite ends disposed at right angles to each other to cooperate with the said tongues and connecting the driving and driven members, coupling pins through the coengaging parts, a coiled link supporting spring engaged with said driving and driven members and rotatable therewith and embracing and laterally supporting said links, bearing members for said driving and driven members, a housing comprising a coiled spring of such dimensions as to be normally out of contact with the link supporting spring, the ends of said bearing members being recessed to receive said housing spring whereby it is supported, and a casing for said housing spring.

2. A flexible shaft comprising driving and driven members, a plurality of barrel-shaped links having tongues at opposite ends disposed at right angles to each other, connectors with slots at opposite ends disposed at right angles to each other to cooperate with the said tongues and connecting the driving and driven members, coupling pins through the coengaging parts, a coiled link supporting spring engaged with said driving and driven members and rotatable therewith and embracing and laterally supporting said links, bearing members for said driving and driven members, a housing comprising a coiled spring of such dimensions as to be normally out of contact with the link supporting spring, the ends of said bearing members being recessed to receive said housing spring whereby it is supported.

3. A flexible shaft comprising driving and driven members, a flexible driving means made up of links, a coiled link supporting spring engaged with said driving and driven members and rotatable therewith and embracing and laterally supporting said links, bearing members for said driving and driven members, a housing comprising a coiled spring of such dimensions as to be normally out of contact with the link supporting spring, the ends of said bearing members being recessed to receive said housing spring whereby it is supported.

4. A flexible shaft comprising driving and driven members, a plurality of links having tongues at opposite ends disposed at right angles to each other, connectors with slots at opposite ends disposed at right angles to each other to cooperate with the said tongues and connecting the driving and driven members, coupling pins through the coengaging parts, and housing means for said link connections.

5. A flexible shaft comprising driving and driven members, a flexible driving means made up of links, a coiled link supporting spring engaged with said driving and driven members and rotatable therewith and embracing and laterally supporting said links, bearing members for said driving and driven members, and a flexible housing means supportably attached to said bearing members.

In witness whereof, I have hereunto set my hand and seal in the presence of two witnesses.

EUGENE HIGGINS.

Witnesses:
WILLIAM O. WULFFE,
E. C. WOOD.